(12) United States Patent
Paul et al.

(10) Patent No.: US 10,072,563 B2
(45) Date of Patent: Sep. 11, 2018

(54) EXHAUST-GAS TURBOCHARGER

(71) Applicant: BorgWarner Inc., Auburn Hills, MI (US)

(72) Inventors: Volker Paul, Neustadt/Weinstrasse (DE); Nico Kanoffsky, Bolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 229 days.

(21) Appl. No.: 14/406,302

(22) PCT Filed: Jun. 10, 2013

(86) PCT No.: PCT/US2013/044925
§ 371 (c)(1),
(2) Date: Dec. 8, 2014

(87) PCT Pub. No.: WO2013/191941
PCT Pub. Date: Dec. 27, 2013

(65) Prior Publication Data
US 2015/0152778 A1    Jun. 4, 2015

(30) Foreign Application Priority Data

Jun. 19, 2012 (DE) .......................... 10 2012 012 616

(51) Int. Cl.
*F02B 37/18* (2006.01)
*F02B 37/24* (2006.01)
(Continued)

(52) U.S. Cl.
CPC ............ *F02B 37/186* (2013.01); *F02B 37/24* (2013.01); *F02C 6/12* (2013.01); *F02C 7/00* (2013.01);
(Continued)

(58) Field of Classification Search
CPC .......... F02B 37/186; F02B 37/24; F02C 6/12; F02C 7/00; F05D 2220/40; Y02T 10/144;
(Continued)

(56) References Cited

U.S. PATENT DOCUMENTS 9,255,582 B2 *   2/2016   Christmann ............... F02C 6/12
2003/0063993 A1 * 4/2003  Reiter, Jr. ............... B22F 3/225
                                                                 419/36
(Continued)

FOREIGN PATENT DOCUMENTS

DE   102008053079 A1 *  4/2010  ................ F02C 6/12
KR   20030018527 A      3/2003
WO   2011069574 A1      6/2011

OTHER PUBLICATIONS

DE102008053079A1 Machine Translation. Accessed EPO website Nov. 23, 2016.*
(Continued)

*Primary Examiner* — Richard Edgar
(74) *Attorney, Agent, or Firm* — Eric L. Doyle; Stephen A. Pendorf; Patent Central LLC

(57) ABSTRACT

An exhaust-gas turbocharger (1) having a turbine (2) which is provided with an adjustable turbine geometry and/or with a wastegate; and having an actuator (11) which is connected by means of a coupling rod (14; 14'; 14") to the adjustable turbine geometry and/or to the wastegate. The coupling rod (14; 14'; 14") is connected at its end regions at one side to the actuator (11) and at the other side to an adjusting shaft arrangement of the variable turbine geometry and/or of the wastegate. The coupling rod (14; 14'; 14") is formed as an MIM component.

11 Claims, 3 Drawing Sheets

(51) Int. Cl.
*F02C 7/00* (2006.01)
*F02C 6/12* (2006.01)

(52) U.S. Cl.
CPC ......... *F05D 2220/40* (2013.01); *Y02T 10/144* (2013.01)

(58) Field of Classification Search
CPC .......... F01D 17/00; F01D 17/10; F01D 17/12; F01D 17/105; F01D 17/20; F01D 17/16; F01D 17/162; F01D 17/165; F01D 17/167
See application file for complete search history.

(56) References Cited

U.S. PATENT DOCUMENTS

| | | |
|---|---|---|
| 2012/0001111 A1 | 1/2012 | Takeda et al. |
| 2012/0117966 A1 | 5/2012 | Boening et al. |
| 2012/0243973 A1 | 9/2012 | Kierat |
| 2014/0127004 A1* | 5/2014 | Schaeflein .............. F01D 17/20 415/159 |
| 2015/0086341 A1* | 3/2015 | Heidingsfelder ....... F02B 39/00 415/148 |
| 2015/0122076 A1* | 5/2015 | Heddy, III .............. F02B 37/24 74/519 |

OTHER PUBLICATIONS

International Search Report and Written Opinion in International Application No. PCT/US2013/044925 dated Aug. 23, 2013.

\* cited by examiner

# EXHAUST-GAS TURBOCHARGER

BACKGROUND OF THE INVENTION

Field of the Invention

The invention relates to an exhaust-gas turbocharger.

Description of the Related Art

An exhaust-gas turbocharger of said type is known from DE 10 2008 053 079 A1. In said known design, a coupling rod connects the actuator (for example an electric actuator or a pneumatic control capsule) to the assembly of an adjusting shaft of an adjustable turbine geometry (VTG), also referred to as a guide grate. Here, the coupling rod transmits the movement generated by the actuator to the VTG. Instead of a VTG or in addition to the VTG, the use of a coupling rod is also possible in the case of an exhaust-gas turbocharger having a wastegate which constitutes a turbine bypass. Here, the coupling rod is mounted on a pin assigned to the actuator and on a pin assigned to the adjusting shaft, and is secured by means of a lock washer.

It is an object of the present invention to provide an exhaust-gas turbocharger which has a coupling rod with increased heat resistance.

The fact that the coupling rod is formed as an MIM component yields the advantage of increased heat resistance in relation to plastic coupling rods.

BRIEF SUMMARY OF THE INVENTION

In relation to coupling rod variants which are constructed from metal, wherein the individual parts thereof are soldered to one another, there is firstly the advantage that an improved geometry configuration in relation to the installation space is possible, and there is secondly the advantage that the production costs are lower in the case of large unit quantities.

The MIM (metal injection molding) process is a powder injection molding process in which a metal powder provided with a binding agent is worked in an injection molding process. The binding agent is subsequently removed. In this way, it is possible to produce parts of complex shape with very low tolerances.

MIM technology is thus a powder metallurgical process in which not a solid metal body but rather a fine powder is used as a starting material for the component to be produced. Said powder is mixed with a binding agent containing plastic, and kneaded to form a so-called feedstock.

The feedstock is subsequently pressed into the injection mold (die) on a commercially customary injection molding machine at high pressure and at approximately 100° C. The so-called green part that is produced already has the final geometry of the component to be produced. Said green part must be removed from the binding agent again in subsequent processing steps in order to obtain a pure metal component. For this purpose, in a preferably multi-stage chemical and thermal process, the binding agent is removed, and the component is simultaneously sintered by means of a sintering process at approximately 1200° C.

Even though the MIM process is already known per se, it has hitherto not been used for the production of coupling rods for exhaust-gas turbochargers, because the size and the weight of such parts is not predestined for said MIM process. This is because tests carried out within the context of the invention have shown for the first time that such MIM components are suitable in particular also on the hot turbine side of an exhaust-gas turbocharger, because it is surprisingly also possible for high-temperature-resistant materials to be worked by means of said production process.

BRIEF DESCRIPTION OF THE SEVERAL VIEWS OF THE DRAWINGS

Further details, features and advantages of the invention become apparent from the following description of an exemplary embodiment with reference to the drawing, in which.

DETAILED DESCRIPTION OF THE INVENTION

Figure 1:
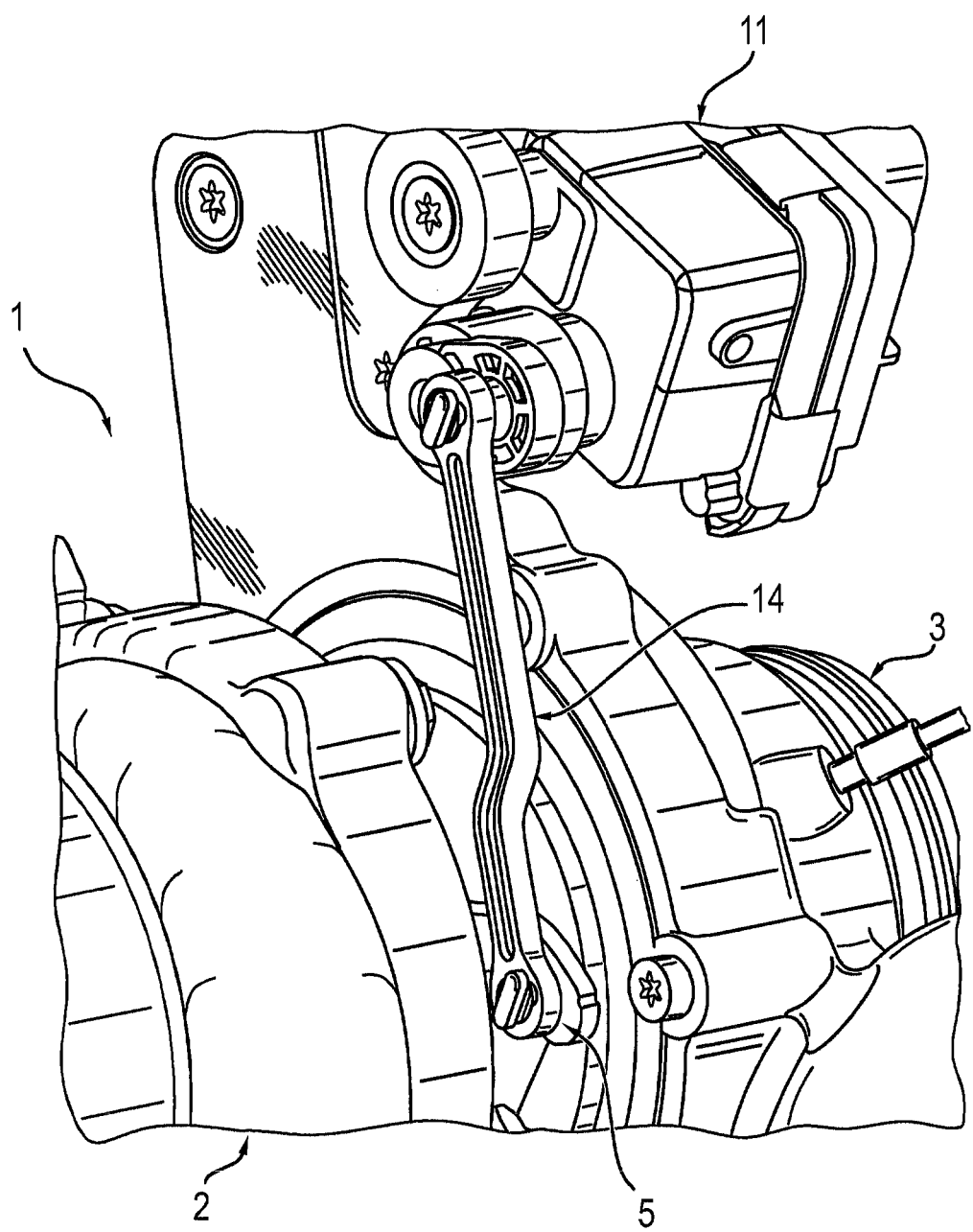
FIG. 1 is a perspective illustration of an exhaust-gas turbocharger according to the invention.

FIG. 1 shows a partial perspective view of a turbocharger according to the invention. The turbocharger 1 has a turbine housing 2 and a compressor housing 3 connected to said turbine housing via a bearing housing. The housings 2 and 3 are arranged along an axis of rotation. In the example, there is provided in the turbine housing 2 an arrangement, not visible in FIG. 1, of a blade bearing ring and a radially outer guide grate, formed by said blade bearing ring, or a variable turbine geometry which has a multiplicity of circumferentially distributed adjustment blades with rotary axles. In this way, nozzle cross sections are formed which are larger or smaller depending on the position of the adjustment blades and via which the exhaust gas of an engine supplied via a supply duct and discharged via a central connector pipe impinges to a greater or lesser extent on the turbine wheel situated in the center on the axis of rotation, in order, via the turbine wheel, to drive a compressor wheel seated on the same shaft.

To control the movement or the position of the adjustment blades, an actuating device or an actuator 11 is provided, which may be designed for example as an electric actuator or as a pneumatic control capsule. In the embodiment illustrated, the actuating device 11 has a control housing 12 and a coupling rod 14 in order to transmit the movement thereof to an adjusting ring situated behind the blade bearing ring, said movement being converted into a slight rotational movement of said adjusting ring. A free space for the adjustment blades is formed between the blade bearing ring and an annular part of the turbine housing 2.

Figure 2:
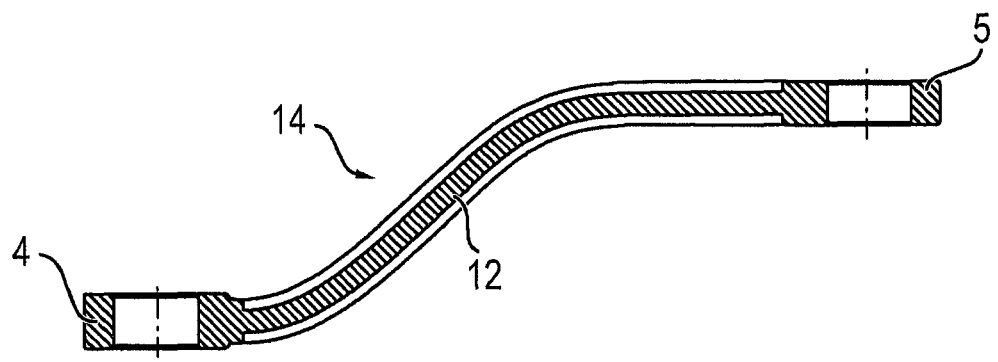
FIGS. 2 and 3 are side-on illustrations of two different embodiments of the coupling rod according to the invention.

FIG. 2 illustrates, as in FIG. 1, a cranked embodiment of the coupling rod 14 according to the invention which is formed according to the invention as an MIM component.

As is conventional, the coupling rod 14 has end regions 4 and 5 which each adjoin a central part 12. This yields a single-piece design which is formed in its entirety as an MIM component.

Figure 3:
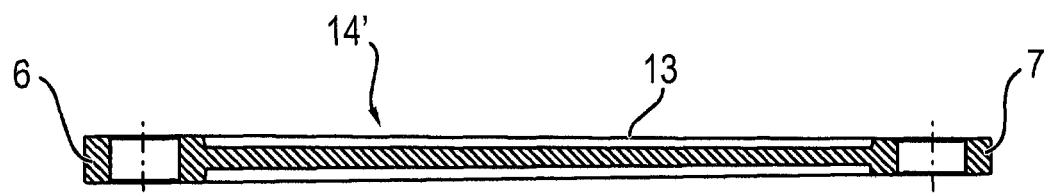

FIG. 3 shows a second embodiment of a coupling rod 14' with end regions 6 and 7 and with a central part 13, which differs from that according to FIG. 2 in that said coupling rod 14' is of planar or straight design without a cranked formation.

Figure 4:
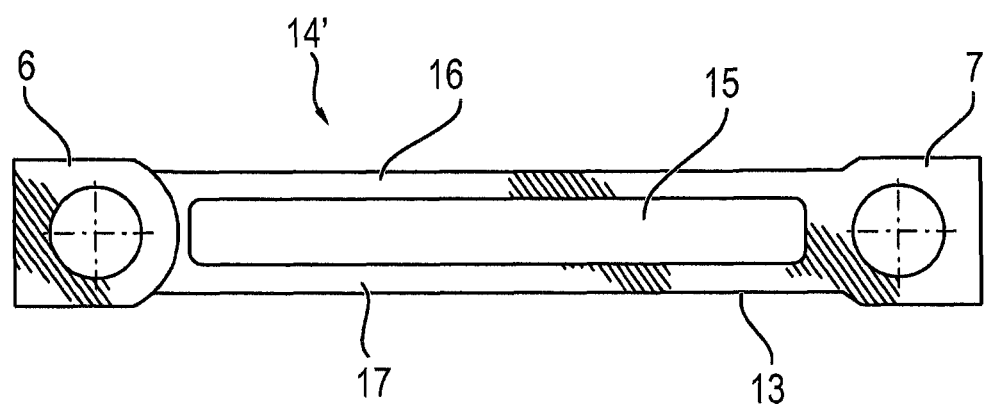
FIG. 4 is a plan view of the coupling rod according to FIG. 3.

FIG. 4 shows a plan view of said coupling rod 14', from which it is clear that the central part 13 is provided with a central recess 15 which is a through recess, that is to say constitutes a complete aperture, which is delimited by webs 16 and 17 of the central part 13.

Figure 5:
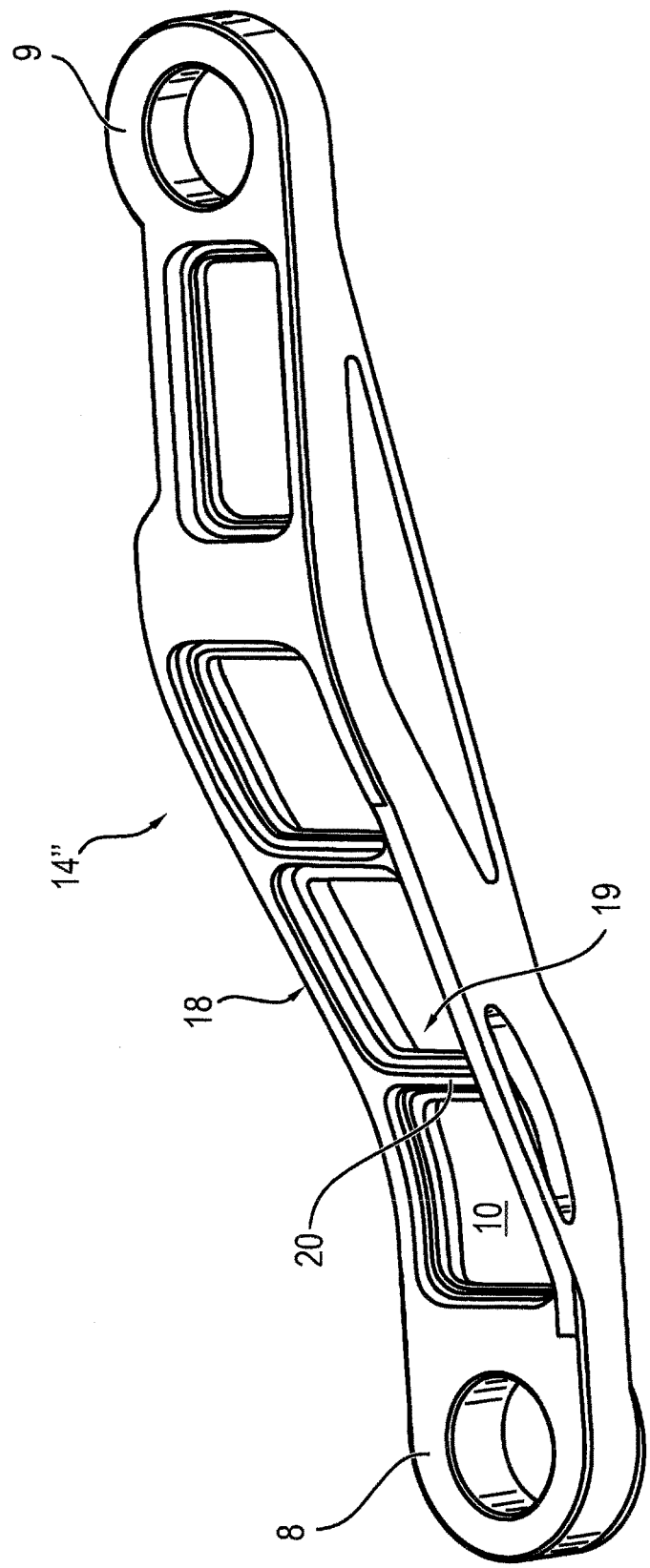
FIG. 5 shows a perspective illustration of a further embodiment of the coupling rod according to the invention.

FIG. 5 shows a further embodiment of a coupling rod 14" designed as an MIM component, said coupling rod being cranked and furthermore being provided, in its central part 18 which is in turn provided with end regions 8 and 9, with a framework structure 19. The framework structure 19 is formed by apertures and webs, wherein the aperture 10 and the web 20 are denoted as examples for all of the apertures and webs. FIG. 5 however shows merely an exemplary embodiment for such a framework structure 19, and is not restricted to the arrangement of the recess 10 and of the webs 20 illustrated therein. In fact, in principle, any desired framework structures 19 of said type may be provided in the coupling rod in accordance with the principles of the present invention, because the MIM process, as explained in the introduction, has the particular advantage that even very complex structures can be produced without problems.

It must be added that the end regions of the embodiment according to FIGS. 2 to 5 are provided in each case with eyelets which are provided for receiving fastening devices such as for example fastening bolts.

In addition to the above written disclosure of the invention, reference is hereby explicitly also made to the illustrative disclosure in FIGS. 1 to 5 to supplement the disclosure.

LIST OF REFERENCE SIGNS

1 Exhaust-gas turbocharger
2 Turbine housing
3 Compressor housing
4-9 End regions
10 Recess/Aperture
11 Actuating device/Actuator
12, 13, 18 Central part
14, 14', 14" Coupling rod
15 Recess
16, 17 Web
19 Framework structure
20 Web

The invention claimed is:

1. An exhaust-gas turbocharger (1) comprising:
a turbine (2) which is provided with an adjustable turbine geometry and/or with a wastegate; and
an actuator (11) which is connected by means of a coupling rod (14; 14'; 14") to the adjustable turbine geometry and/or to the wastegate, wherein the coupling rod (14; 14'; 14") is connected at its end regions at one side to the actuator (11) and at the other side to an adjusting shaft arrangement of the variable turbine geometry and/or of the wastegate,
wherein
the coupling rod (14; 14'; 14") is formed by a powder injection molding process in which a metal powder provided with a binding agent is worked in an injection molding process followed by removal of the binding agent and sintering of the metal powder, and
the coupling rod (14") is provided with a framework structure (19) comprising apertures (10) and webs (20).

2. The exhaust-gas turbocharger as claimed in claim 1, wherein the coupling rod (14; 14") is of cranked design.

3. The exhaust-gas turbocharger as claimed in claim 1, wherein at least one end of the coupling rod (14") is connected to the turbine side of the turbocharger.

4. The exhaust-gas turbocharger as claimed in claim 1, wherein at least one end of the coupling rod (14") is connected to a variable turbine geometry (VTG) mechanism.

5. The exhaust-gas turbocharger as claimed in claim 1, wherein at least one end of the coupling rod (14") is connected to a wastegate mechanism.

6. A coupling rod (14; 14'; 14") of an exhaust-gas turbocharger (1), comprising:
a central part (12; 13; 18) and
two end regions (4, 5; 6, 7; 8, 9) which adjoin the central part (12; 13; 18),
wherein the central part and the end regions are formed as a single-piece component by a powder injection molding process in which a metal powder provided with a binding agent is worked in an injection molding process followed by removal of the binding agent and sintering of the metal powder, and
wherein the coupling rod (14") is provided with a framework structure (19) comprising apertures (10) and webs (20).

7. The coupling rod as claimed in claim 6, wherein the central part (12; 18) is of cranked design.

8. The exhaust-gas turbocharger as claimed in claim 6, wherein at least one end of the coupling rod (14") is connected to the turbine side of the turbocharger.

9. The exhaust-gas turbocharger as claimed in claim 6, wherein at least one end of the coupling rod (14") is connected to a variable turbine geometry (VTG) mechanism.

10. The exhaust-gas turbocharger as claimed in claim 6, wherein at least one end of the coupling rod (14") is connected to a wastegate mechanism.

11. A method for reducing heat transfer from a turbine housing of an exhaust-gas turbocharger (1) to an actuator associated with the turbine, the method comprising
(a) forming a coupling rod (14; 14'; 14") with a framework structure (19) comprising apertures (10) and webs (20) by a powder injection molding process in which a metal powder provided with a binding agent is worked in an injection molding process followed by removal of the binding agent and sintering of the metal powder, thereby forming a coupling rod having lower thermal conductivity than a similarly dimensioned solid metal coupling rod comprised of the same metal, and
(b) forming the exhaust gas turbocharger (1) with:
a turbine (2) which is provided with an adjustable turbine geometry and/or with a wastegate; and
an actuator (11) which is connected by means of the coupling rod (14; 14'; 14") to the adjustable turbine geometry and/or to the wastegate, wherein the coupling rod (14; 14'; 14") is connected at its end regions at one side to the actuator (11) and at the other side to an adjusting shaft arrangement of the variable turbine geometry and/or of the wastegate.

* * * * *